(12) United States Patent
Mizuta

(10) Patent No.: US 7,381,286 B2
(45) Date of Patent: Jun. 3, 2008

(54) LAMINATE SHEET MATERIAL PUNCHING METHOD AND OPTICAL DISK MANUFACTURING METHOD

(75) Inventor: Akira Mizuta, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 817 days.

(21) Appl. No.: 10/640,642

(22) Filed: Aug. 14, 2003

(65) Prior Publication Data

US 2004/0031362 A1 Feb. 19, 2004

(30) Foreign Application Priority Data

Aug. 14, 2002 (JP) .............................. 2002-236355

(51) Int. Cl.
| | |
|---|---|
| B29C 65/48 | (2006.01) |
| B32B 37/16 | (2006.01) |
| B32B 37/26 | (2006.01) |
| B32B 38/04 | (2006.01) |
| B32B 37/02 | (2006.01) |
| B32B 37/22 | (2006.01) |

(52) U.S. Cl. ............... 156/252; 156/250; 156/254; 156/510; 428/40.1; 428/41.7; 428/41.8

(58) Field of Classification Search ............... 156/250, 156/254, 261, 510, 289, 252; 428/40.1, 41.7, 428/41.8

See application file for complete search history.

(56) References Cited

U.S. PATENT DOCUMENTS

| | | | | |
|---|---|---|---|---|
| 3,860,473 A | * | 1/1975 | Wesen | ......................... 156/252 |
| 4,599,125 A | * | 7/1986 | Buck | ........................... 156/248 |
| 5,882,555 A | * | 3/1999 | Rohde et al. | ............... 264/1.33 |
| 5,980,677 A | * | 11/1999 | Amo et al. | .................. 156/230 |
| 6,403,191 B1 | * | 6/2002 | Casagrande | ................ 428/42.2 |
| 6,511,731 B2 | * | 1/2003 | Clark | .......................... 428/136 |
| 6,884,504 B2 | * | 4/2005 | Liu et al. | ..................... 428/343 |
| 6,991,695 B2 | * | 1/2006 | Tait et al. | ................... 156/248 |
| 2001/0010851 A1 | * | 8/2001 | Kita et al. | .................. 428/64.1 |

FOREIGN PATENT DOCUMENTS

| | | |
|---|---|---|
| JP | 11-031337 A | 2/1999 |
| JP | 2003-157588 A | 5/2003 |

* cited by examiner

*Primary Examiner*—Philip C. Tucker
*Assistant Examiner*—Sonya Mazumdar
(74) *Attorney, Agent, or Firm*—Sughrue Mion, PLLC

(57) ABSTRACT

A laminate sheet material punching method, in which a part of a cover sheet is punched from a laminate sheet material including the cover sheet which has an adhesive film formed at one surface thereof and is adhered to a recording side of a disk substrate of an optical disk via the adhesive film, a strip-off sheet adhered to a surface of the adhesive film on the cover sheet and a protective sheet adhered to the opposite surface of the cover sheet, in a shape corresponding to a shape of the recording side of the disk substrate, the laminate sheet material punching method includes the steps of: pressing a punching blade whose blade tip extends along a path corresponding to the peripheral edge of the recording side of the disk substrate, against the surface of the strip-off sheet; cutting the strip-off sheet and the cover sheet with the punching blade.

13 Claims, 8 Drawing Sheets

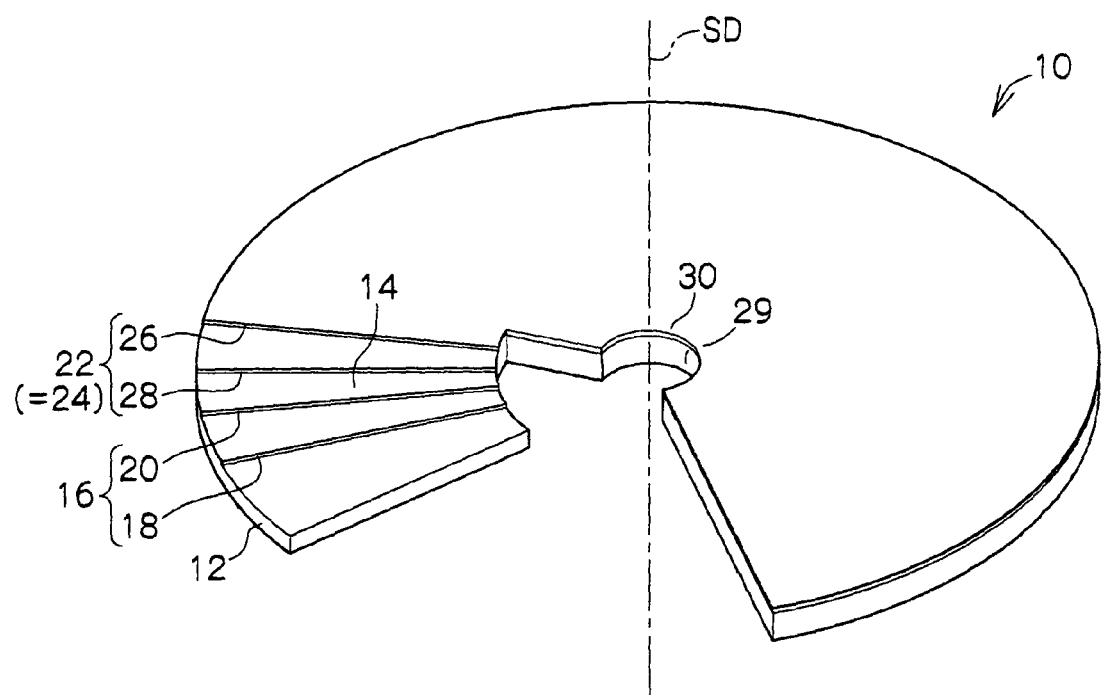

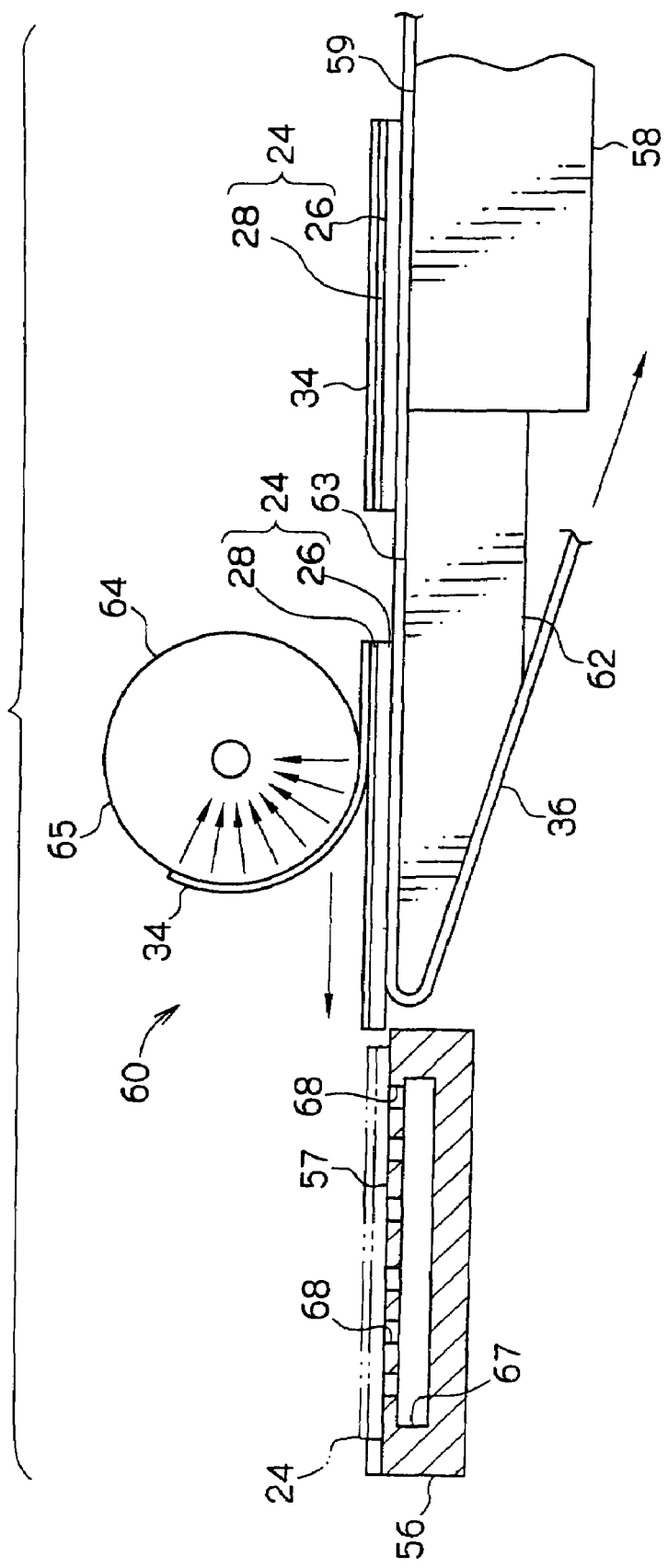

LAMINATE SHEET MATERIAL PUNCHING METHOD AND OPTICAL DISK MANUFACTURING METHOD

CROSS-REFERENCE TO RELATED APPLICATION

This application claims priority under 35 USC 119 from Japanese Patent Application No. 2002-236355, the disclosure of which is incorporated by reference herein.

BACKGROUND OF THE INVENTION

1. Field of the Invention

The present invention relates to a laminate sheet material punching method, in which a laminate sheet material including a cover sheet is punched to form the cover sheet to be adhered to a disk substrate into a required planar shape. The present invention also relates to an optical disk manufacturing method, in which a transparent cover layer is formed by adhering the cover sheet onto the disk substrate.

2. Description of the Related Art

Optical disks for recording or playback information by using a laser beam, such as a Compact Disk-Recordable (CD-R), a Compact Disk (CD), a Digital Versatile Disk (DVD) and a Digital Versatile Disk-Recordable (DVD-R), are popular. In recent years, there is a demand for the optical disk to store a larger quantity of information such as image information, and therefore, the study of higher density has been promoted. The recording density of the optical disk generally depends on a spot size of a light beam on the disk. The spot size is proportional to $\lambda/NA$, wherein $\lambda$ represents the wavelength of a laser beam, and NA represents the numerical apertures of an objective lens. Therefore, in order to enhance the recording density with respect to the optical disk, it is necessary to shorten the wavelength of the laser beam and increase the number NA of the objective lens. However, since coma aberration generated by the inclination of the optical disk is increased in proportion to the third power of NA, a margin with respect to the inclination of the optical disk becomes extremely small due to the increase of the number of NA, thereby blurring the beam spot even with a slight inclination so as to make it impossible to achieve the recording/playback in high density. For example, as disclosed in Japanese Patent Application Laid-open (JP-A) No. 11-31337, a cover layer, through which the laser beam passes, is formed in a sufficient thinness (for example, about 0.1 mm) in the optical disk which can cope with the high density, and thus, it is necessary to suppress an increase in coma aberration caused by the inclination of the disk in association with the increase of the number of NA.

In a process for manufacturing the above-described optical disk, for example, a thin film-like cover sheet formed of a transparent film as a basic material made of polycarbonate or the like is adhered to a recording surface side of a disk substrate having an information recording layer formed thereon, and by this cover sheet, a transparent cover layer is formed on the disk substrate. At this time, an adhesive film is previously formed on one of the side of the cover sheet, i.e., on a adhering surface, and the cover sheet is adhered to the recording side of the disk substrate via the adhesive film.

In many cases, the above-described cover sheet, which is laminated with a disk substrate, is manufactured by using a laminate sheet material of a four-layered structure, in which strip-off sheets and protective sheets are adhered to both of the adhesive surface and light incident surface of the elongated belt-like cover sheet, as a process material. In particular, for example, the protective sheet and the cover sheet in the laminate sheet material are punched in a circular or annular shape corresponding to the shape of the recording side of the disk substrate from the surface on the side of the protective sheet by a punching blade whose blade tip extends in an annular manner, and then, the punched cover sheet is adhered to the recording side of the disk substrate. At this time, the strip-off sheet adhered to the adhesive film of the cover sheet is not punched by the punching blade, but usually, remains in an elongated belt-like manner. The elongated belt-like strip-off sheet is used as a carrier base for conveying the cover sheet punched from the laminate sheet material. That is, the cover sheet per se is very thin (for example, about 80 to 100 μm), and therefore, it is difficult to convey the cover sheet without any occurrence of a defect such as creases. For this reason, conveying force is transmitted to the cover sheet via the strip-off sheet in the state in which the strip-off sheet remains on the cover sheet, thereby making it possible to readily convey the cover sheet punched in the planar shape corresponding to the shape of the recording side of the disk substrate without any occurrence of a defect such as creases.

FIG. 7 shows one example of a method for conveying a cover sheet punched from a laminate sheet material by a conventional punching method. In FIG. 7, a case in which a cover sheet 114 is conveyed onto a receiving table 112 while a strip-off sheet 118 is being stripped from the cover sheet 114 by a sheet strip-off apparatus 110 is shown. The sheet strip-off apparatus 110 is provided with a wedge-shaped strip-off guide member 111 for stripping off the strip-off sheet 118 from the cover sheet 114. The strip-off guide member 111 is supported in so that the tip portion thereof is oriented to a sheet conveying table.

Furthermore, the sheet strip-off apparatus 110 is provided with a tension mechanism (not shown) for applying tensile force to the strip-off sheet 118 in a predetermined strip-off direction (i.e., the direction indicated by arrow E) while applying predetermined tensile force to the strip-off sheet 118 having the plurality of cover sheets 114 adhered thereon. Consequently, in the sheet strip-off apparatus 110, the cover sheet 114 is moved from the base and of the strip-off guide member 111 toward the tip and thereof while being brought into press-contact with the strip-off guide member 111 via the strip-off sheet 118 by a constant press-contact force. At this time, the strip-off sheet 118 adhered to the cover sheet 114 is peeled off from the cover sheet 114 in the vicinity of the tip end portion of the strip-off guide member 111. Moreover, the cover sheet 114 from which the strip-off sheet 118 has been peeled off is pushed forward of the strip-off guide member 111, and slides onto the receiving table 112.

However, when the cover sheet is punched from the side of a protective sheet 120 of the laminate sheet material by a punching blade with the strip-off sheet 118 remaining thereon as a carrier base in an elongated belt-like manner, a substantially wedge-shaped burr 122, which projects toward an adhesive film 116 may be produced at the outer peripheral edge of a resin film 115, which forms the base material of the cover sheet 114, as shown in FIG. 8. The burr 122 produced at the resin film 115 degrades the adhesiveness between a disk substrate 117 and the outer peripheral portion of the cover sheet 114. Additionally, air may intrude between the disk substrate 117 and the cover sheet 114 in an optical disk or a warp may be generated at a light incident surface, thereby leading to a decrease in yield of a non-defective optical disk.

SUMMARY OF THE INVENTION

In view of the aforementioned, an object of the present invention is to provide a laminate sheet material punching method that prevents production of a burr, which may degrade the adhesiveness between a disk substrate and a cover sheet, at the cover sheet punched from a laminate sheet material.

Further, another object of the invention is to provide an optical disk manufacturing method that prevents degradation of the adhesiveness between a disk substrate and a cover sheet caused by a burr, which is produced at the cover sheet punched from a laminate sheet material.

A first aspect of the present invention provides a laminate sheet material punching method, in which a part of a cover sheet is punched from a laminate sheet material including the cover sheet which has an adhesive film formed at one surface thereof and is adhered to a recording side of a disk substrate of an optical disk via the adhesive film, a strip-off sheet adhered to a surface of the adhesive film on the cover sheet and a protective sheet adhered to a surface of the cover sheet, which surface is opposite from the adhesive film, in a planar shape corresponding to a shape of the recording side of the disk substrate, the laminate sheet material punching method comprising the steps of: (a) pressing a punching blade whose blade tip extends along a path corresponding to the peripheral edge of the recording side of the disk substrate, against the surface of the strip-off sheet of the laminate sheet material; (b) cutting the strip-off sheet and the cover sheet of the laminate sheet material with the punching blade; and (c) punching a part of the strip-off sheet and a part of the cover sheet from the laminate sheet material in the planar shape corresponding to the shape of the recording side of the disk substrate.

According to the above-described laminate sheet material punching method, a punching blade whose blade tip extends along a path corresponding to the peripheral edge of the recording side of the disk substrate, is pressed against the surface of the strip-off sheet in the laminate sheet material. The strip-off sheet and the cover sheet in the laminate sheet material are cut by the punching blade and a part of the strip-off sheet and a part of the cover sheet are punched from the laminate sheet material in the planar shape corresponding to the shape of the recording side of the disk substrate. Consequently, the punching blade bites into the cover sheet in the laminate sheet material from the surface of the adhesive film toward the opposite surface (i.e., a light incident surface), and thus, a part of the cover sheet formed into the planar shape corresponding to the shape of the recording side is separated from other portions by the punching blade.

At this time, when a burr is formed at the peripheral edge of the cover sheet punched by shearing force of the punching blade, the burr projects in a direction substantially the same as a direction of the shearing force of the punching blade, i.e., toward a side opposite to the adhesive film. As a result, it is possible to prevent the burr to project toward the adhesive film at the cover sheet punched from the laminate sheet material. Thus, it is possible to prevent any degradation of the adhesiveness between the cover sheet and the disk substrate caused by the burr, which is formed at the peripheral edge of the cover sheet at the time of punching, even when the cover sheet is adhered to the recording side of the disk substrate via the adhesive film.

Furthermore, if the protective sheet is not punched and remains in the laminate sheet material when the laminate sheet material is punched by the punching blade, the cover sheet can be conveyed by transmitting a conveying force to the cover sheet, which is punched via the protective sheet by utilizing the protective sheet as a carrier base, and the cover sheet can be readily conveyed without any generation of a defect such as creases in the cover sheet.

A second aspect of the present invention provides a laminate sheet material punching method for punching a part of a cover sheet from a laminate sheet material in such a manner as to correspond to the shape of a recording side of a disk substrate of an optical disk, the laminate sheet material including the cover sheet having an adhesive film and a resin film, a strip-off sheet adhered to the adhesive film, and a protective sheet adhered to a surface of the cover sheet, which surface is opposite from the adhesive film, the laminate sheet material punching method comprising the steps of: (a) pressing a punching blade whose blade tip extends along a path corresponding to the peripheral edge of the recording side of the disk substrate, against the surface of the strip-off sheet; and (b) cutting the cover sheet toward the protective sheet from the side of the strip-off sheet with the punching blade.

A third aspect of the present invention provides an optical disk manufacturing method for adhering, to a recording side of a disk substrate, a cover sheet punched from a laminate sheet material in a planar shape corresponding to a shape of the recording side of the disk substrate according to the laminate sheet material punching method according to claim 1, the optical disk manufacturing method comprising the steps of: (a) disposing an adhesive film of the cover sheet so as to face the recording side of the disk substrate; (b) placing one end of the cover sheet so as to coincide with one end of the disk substrate, and holding another end of the cover sheet so as to form a predetermined angle between the cover sheet and the disk substrate; and (c) gradually lowering the other end of the cover sheet so as to coincide with the other end of the disk substrate.

In the above-described optical disk manufacturing method, the cover sheet punched from the laminate sheet material in the planar shape corresponding to the shape of the recording side of the disk substrate is adhered to the recording side of the disk substrate via the adhesive film in the process for adhering the cover sheet to the disk substrate. Consequently, even if a burr is formed at the peripheral edge of the cover sheet punched by a shearing force of the punching blade, the burr projects toward a side opposite to the adhesive film, as described above. Thus, it is possible to prevent degradation of the adhesiveness between the cover sheet and the disk substrate caused by the burr, which is produced at the peripheral edge of the cover sheet, when the cover sheet is adhered to the recording side of the disk substrate via the adhesive film.

A fourth aspect of the present invention provides a laminate sheet material punching apparatus comprising: a feeding section for supplying a laminate sheet material; a blade roller having a plurality of outer peripheral punching blades disposed along a circumferential direction and a plurality of inner circumferential punching blades disposed coaxially with the outer peripheral punching blades; and a receiving roller facing the blade roller and being disposed in parallel to the axis of the blade roller, wherein the blade roller and the receiving roller are rotated at an uniform linear velocity, and the laminate sheet material is punched by being conveyed between the blade roller and the receiving roller.

BRIEF DESCRIPTION OF THE DRAWINGS

FIG. 1 is a perspective view showing a configuration of an optical disk, to which an optical disk manufacturing method according to an embodiment of the present invention can be applied.

FIG. 3 is a side view showing the configurations of a slide table for conveying a cover sheet to a receiving table and a strip-off apparatus for stripping off a strip-off sheet and a protective sheet from the cover sheet according to the embodiment of the invention.

DETAILED DESCRIPTION OF THE INVENTION

Figure 2A:
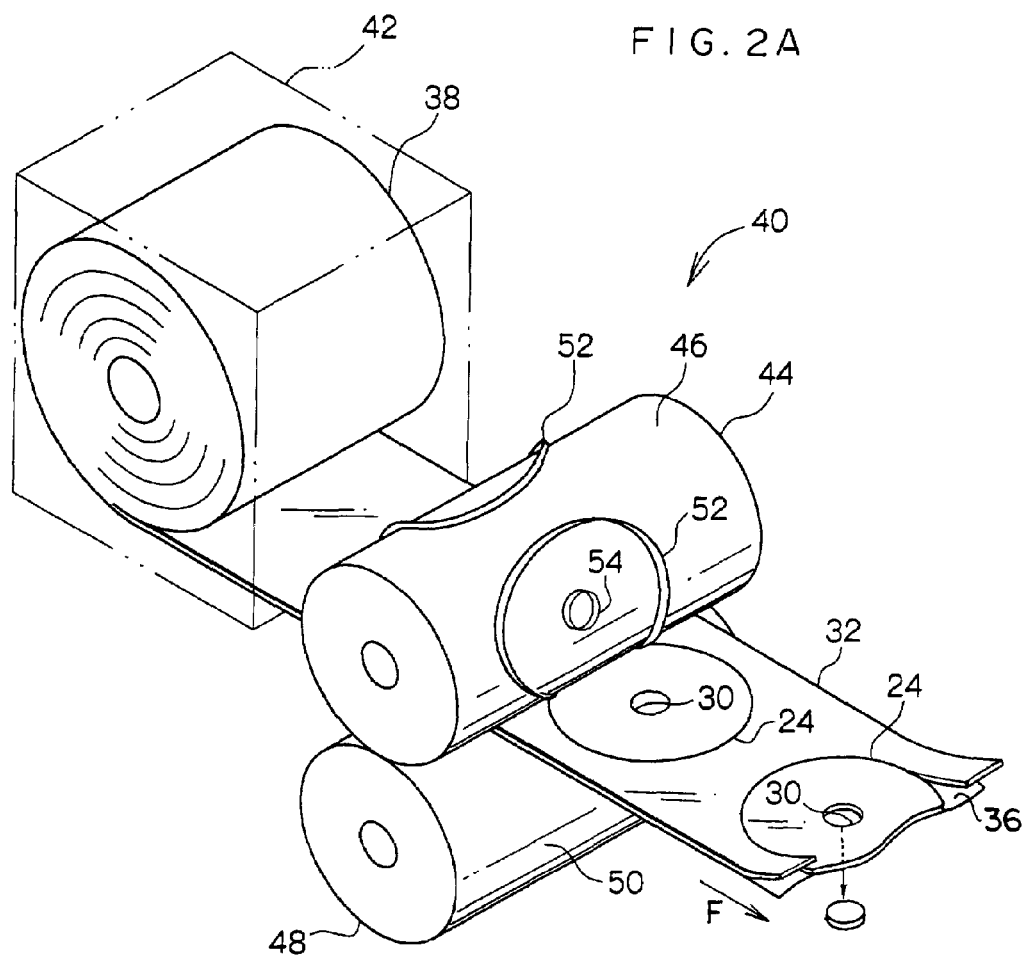
FIG. 2A is a perspective view showing a configuration of a laminate sheet material punching apparatus for use in the optical disk manufacturing method according to the embodiment of the invention.

Hereinafter, an optical disk manufacturing method relating to an embodiment of the present invention will be described with reference to the drawings.

Configuration of Embodiment

First, a simple description will be given of the configuration of an optical disk according to the embodiment of the invention. FIG. 1 shows an optical disk 10 manufactured by an optical disk manufacturing method according to the embodiment of the invention. The optical disk 10 is an optical disk which can record information in high density, compared with a conventional DVD-R, and the like. For example, in comparison with a conventional optical disk, a blue-violet laser beam of a short wavelength is used as a laser beam for recording/playback, and further, the number of numerical apertures NA of an objective lens in a recording/playback apparatus is increased up to about 0.85. Thus, a recording capacity on a single-side with respect to the optical disk 10 having a diameter of 12 cm is increased up to 25 G bite or more.

In the optical disk 10, a disk substrate 12, which is formed into a disk shape, is provided. One side of the disk substrate 12 serves as an information recording side 14. A light reflecting layer 18 and a light absorbing layer 20 are laminated in order on the recording side of the disk substrate 12. The light reflecting layer 18 and the light absorbing layer 20 form an information recording layer 16 (hereinafter simply referred to as "a recording layer"). Further, in the optical disk 10, a transparent cover layer 22 is provided on the disk substrate 12 so as to cover the recording layer 16. The cover layer 22 is formed of a cover sheet 24 which comprises a transparent resin film 26 and an adhesive film 28, and the thickness thereof is about 100 μm.

The disk substrate 12 is molded by using a resin such as polycarbonate (PC) as a raw material. The cover sheet 24 forming the cover layer 22 in the optical disk 10 is formed of the resin film 26 made of a transparent resin such as PC or polyethylene terephthalate (PET) as a base material, in which the resin film 26 has on one side thereof the adhesive film 28 formed in a predetermined thickness. The adhesive film 28 is formed of a known adhesive agent such as acrylic-base, rubber-base or silicon-base adhesive agent. However, from the viewpoint of transparency and durability, the adhesive film 28 formed of an acrylic adhesive agent is preferable. The thickness of the cover sheet 24 is set to substantially the same value as that of the thickness of the cover layer 22 in the optical disk 10. For example, if the value of the thickness of the cover layer 22 is set to about 100 μm, the thickness of the resin film 26 is set to about 80 μm and the thickness of the adhesive film 28 is set to about 20 μm.

At the center of the disk substrate 12, a circular center hole 29 is formed along an axis SD serving as the rotating center of the optical disk 10. Also at the center of the cover layer 22 is formed, on the axis SD, a circular opening 30 having substantially the same inner diameter as that of the center hole 29. However, if the cover layer 22 is sufficiently positioned at the inner circumferential end thereof inward of the recording layer 16 of the disk substrate 12, the inner diameter of the opening 30 may be increased more than the inner diameter of the center hole 29 within the range satisfying the above-described positional relationship.

In a manufacturing line for the above-described optical disk, the disk substrate manufacturing process, in which the recording layer 16 is formed on one side of the disk substrate 12, which is formed by molding or the like, and the cover sheet forming process, in which the cover sheet 24 to be adhered to the disk substrate 12, which is formed of a laminate sheet material 32 (see FIG. 2A), are carried out independently. After the disk substrate 12 and the cover sheet 24 are manufactured in these processes, the cover sheet 24 is adhered to the disk substrate 12 in a adhering process, thereby manufacturing the optical disk 10 shown in FIG. 1.

Figure 2B:
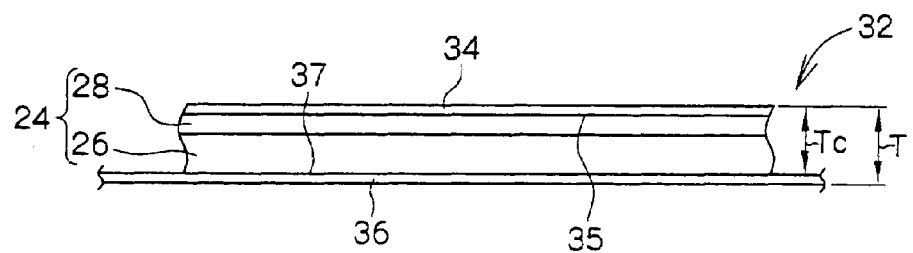
FIG. 2B is a side view showing the configuration of the laminate sheet material shown in FIG. 2A.

The cover sheet 24 is molded by using the laminate sheet material 32, as shown in FIG. 2B, as a raw material. The laminate sheet material 32 is formed in a four-layer structure including the resin film 26, the adhesive film 28 formed on one side of the resin film 26, a strip-off sheet 34 adhered to the surface of the adhesive film 28 and a protective sheet 36 adhered to the resin film 26 on the side opposite to the adhesive film 28. Each of the strip-off sheet 34 and the protective sheet 36 is formed from a resin such as PET as a raw material and is formed in a thin film shape. A release agent for achieving an excellent stripping property is applied to each of adhering surfaces 35 and 37 of the strip-off sheet 34 and the protective sheet 36. The release agent, which is applied to the adhering surface 35 of the strip-off sheet 34 includes, for example, silicon as the main component. An adhesive agent including, for example, vinyl acetate as the main component is applied to the adhering surface 37 of the protective sheet 36 in order to maintain the adhesiveness to the resin film 26.

As shown in FIG. 2A, the laminate sheet material 32 is formed in an elongated belt-like shape, and therefore, is supplied to the optical disk manufacturing line as a sheet roll 38, in which the laminate sheet material 32 is wound around in a roll fashion. The sheet roll 38 is loaded in a feeding section 42 in a punching apparatus 40, and the sheet roll 38 is rotatably supported in the feeding section 42. In the punching apparatus 40, a blade roller 44 and a receiving roller 48, which make a pair with each other are provided. At a roller surface 46 of the blade roller 44, along a circumferential direction, a plurality of sets (for example, three sets) of an outer peripheral punching blade 52 and an inner circumferential punching blade 54 are coaxially disposed. The receiving roller 48 is located axially in parallel under the blade roller 44. These rollers 44 and 48 rotate at an uniform linear velocity by receiving torque respectively from a roller driver section (not shown).

The outer peripheral punching blades 52 of the blade roller 44 are provided in an annular manner at the roller surface 46. The outer peripheral punching blades 52 are formed in such a manner that the blade tip portions thereof extend along a circular path having a diameter substantially the same as or slightly smaller than that of the disk substrate 12 when they are developed on a plane. Furthermore, the length of the outer peripheral punching blade 52 projecting from the roller surface 46 is set to be equal to or slightly longer than a thickness $T_c$ (see FIG. 2B) from the surface of the strip-off sheet 34 to the adhering surface of the protective sheet 36 in the laminate sheet material 32. In this way, the blade tip of the outer peripheral punching blade 52 reaches the vicinity of the middle of the thickness of the protective sheet 36, and can compensate for the amount of elastic deformation of the laminate sheet material 32 so as to securely cut the protective sheet 36 and the resin film 26.

The inner circumferential punching blades 54 of the blade roller 44 are also provided in an annular manner on the roller surface 46, and the blade tip portions thereof extend along a circular path of substantially the same diameter as that of the opening 30 (see FIG. 1) in the cover sheet 24 when they are developed on a plane. Furthermore, the length of the inner circumferential punching blade 54 projecting from the roller surface 46 is set to be equal to a thickness T of the entire laminate sheet material 32 (see FIG. 2B) or slightly shorter than the thickness T in consideration of the compressive deformation of the laminate sheet material 32 at the time of punching.

A roller surface 50 of the receiving roller 48 is formed of a curved surface having a constant curvature radius from the axis thereof, and is formed from a material such as metal or a hard resin, which has a hardness and abrasion resistance of a predetermined value or more. Here, the receiving roller 48 is urged toward the blade roller 44 by predetermined force applied from an urging mechanism (not shown).

In the punching apparatus 40, the laminate sheet material 32 is sent between the blade roller 44 and the receiving roller 48 from the sheet roll 38 loaded in the feeding section, and the laminate sheet material 32 is held between the rollers 44 and 48. The blade roller 44 and the receiving roller 48 are rotated at an uniform linear velocity with respect to each other, and sends the laminate sheet material 32 downstream. Since the receiving roller 48 is urged by the urging mechanism at this time, the laminate sheet material 32 is conveyed at a constant speed in a conveyance direction (i.e., in a direction indicated by an arrow F) by the conveying force applied from the rollers 44 and 48 while being pressurized or compressed between the roller surface 46 of the blade roller 44 and the roller surface 50 of the receiving roller 48. When the laminate sheet material 32 is conveyed by the rollers 44 and 48, the blade roller 44 brings its roller surface 46 into press-contact with the surface of the strip-off sheet 34. Further, the receiving roller 48 brings the roller surface 50 into press-contact with the surface of the protective sheet 36.

While conveying the laminate sheet material 32 in the conveyance direction together with the receiving roller 48, the blade roller 44 presses the outer peripheral punching blade 52 against the strip-off sheet 34 in the laminate sheet material 32, and cuts the laminate sheet material 32 by the outer peripheral punching blade 52 and the inner circumferential punching blade 54. At this time, the length of the outer peripheral punching blade 52 projecting from the roller surface 46 is equal to or slightly longer than the thickness $T_c$ (see FIG. 2B) of the laminate sheet material 32. Consequently, the outer peripheral punching blade 52 cuts through the strip-off sheet 34 in the laminate sheet material 32 and the resin film 26 having the adhesive film 28 formed on one side thereof. However, the outer peripheral punching blade 52 does not cut through the protective sheet 36. Therefore, the strip-off sheet 34 and the resin film 26 of the laminate sheet material 32 passing between the rollers 44 and 48 are punched in a disk-like shape at a portion inside of the outer peripheral punching blade 52, and are cut off from the residual portion. Moreover, the protective sheet 36 of the laminate sheet material 32 passing between the rollers 44 and 48 is not punched by the rollers 44 and 48, and is conveyed in the conveyance direction in an elongated belt-like manner.

Additionally, since the length of the inner circumferential punching blade 54 projecting from the roller surface 46 is equal to or slightly shorter than the thickness T (see FIG. 2B) in the laminate sheet material 32, the inner circumferential punching blade 54 cuts through the entire laminate sheet material 32, and thus, bores a circular through hole at the center of the portion punched out by the outer peripheral punching blade 52. Here, the resin film 26 and the adhesive film 28 punched out in the disk-like shape by the outer peripheral punching blade 52 becomes the cover sheet 24 which will be adhered to the disk substrate 12, as shown in FIG. 2A, and further, the through hole of the resin film 26 punched out by the inner circumferential punching blade 54 becomes the opening 30 in the cover sheet 24. The cover sheet 24 is conveyed in the conveyance direction having the strip-off sheet 34, which is punched out by the outer peripheral punching blade 52 and the inner circumferential punching blade 54 in the same planar shape, adhered thereon.

In the punching apparatus 40, the outer periphery of the strip-off sheet 34 and the cover sheet 24 of the resin film 26 are stripped off and removed from the laminate sheet material 32, which has passed between the blade roller 44 and the receiving roller 48, and further, the inner circumference of the opening 30 of the laminate sheet material 32 is punched out and removed.

In the optical disk manufacturing line, the cover sheet 24, which is punched out from the laminate sheet material 32 by the punching apparatus 40, is conveyed onto a receiving table 56 (see FIG. 3). At this time, since the cover sheet 24 is conveyed by applying the conveying force to the protective sheet 36, which remains in the elongated belt-like manner in the laminate sheet material 32, the cover sheet 24 can be readily conveyed from the punching apparatus 40 onto the receiving table 56 without any generation of a defect such as creases.

As shown in FIG. 3, a guide table 58 for guiding the cover sheet 24 to the receiving table 56 is provided in the optical disk manufacturing line. A strip-off apparatus 60 is provided at the terminal end portion of the guide table 58, to strip off the strip-off sheet 34 and the protective sheet 36 from the cover sheet 24. The upper surface of the guide table 58 is a smooth and flat slide surface 59. The cover sheet 24 is conveyed from the punching apparatus 40 to the strip-off apparatus 60 while sliding on the slide surface 59.

The strip-off apparatus 60 is provided with a wedge-shaped strip-off guide member 62 extending from the guide table 58 toward the receiving table 56 side. An upper surface 63 of the strip-off guide member 62 is brought into contact with the cover sheet 24 via the protective sheet 36. The upper surface 63 is supported so as to be substantially flush with the slide surface 59 of the guide table 58. The cover sheet 24 conveyed on the slide surface 59 is placed at the upper surface 63 of the strip-off guide member 62 via the protective sheet 36. A tensile force is applied to the protective sheet 36 in this state, and by stripping off the protective sheet 36 from the cover sheet 24 along the tip end portion of the strip-off guide member 62, the portion of the cover sheet 24, of which the strip-off sheet 34 is stripped off, is conveyed onto the receiving table 56 from the strip-off guide member 62.

Moreover, a suction roller 64 is rotatably supported above the strip-off guide member 62 in the strip-off apparatus 60. The suction roller 64 has, at its roller surface 65, numerous suction holes (not shown) to which a negative pressure is supplied from the outside of the roller. The suction roller 64 is rotated by following the cover sheet 24 while its roller surface 65 is brought into press-contact with the strip-off sheet 34 adhered to the adhesive film 28 of the cover sheet 24. In this manner, the strip-off sheet 34 is stripped off from the adhesive film 28 of the cover sheet 24 by the suction force of the suction roller 64, and then, is transferred onto the roller surface 65 of the suction roller 64. The strip-off sheet 34 is stripped off from the roller surface 65, and then, is collected to a collection container, not shown, or the like.

In the receiving table 56, a negative pressure chamber 67 is provided under a placing surface 57, on which the cover sheet 24 is placed, and further, plural suction holes 68 which penetrate through the placing surface 57 from the negative pressure chamber 67, are formed. The negative pressure chamber 67 is connected to a vacuum generator (not shown) such as a vacuum pump. When the cover sheet 24 is placed at a predetermined position on the placing surface 57, a negative pressure is supplied to the negative pressure chamber 67 from the vacuum generator. Consequently, the cover sheet 24 is sucked onto the placing surface 57 by the operation of the negative pressure through the suction holes 68 in close contact without any clearance.

Figure 4:
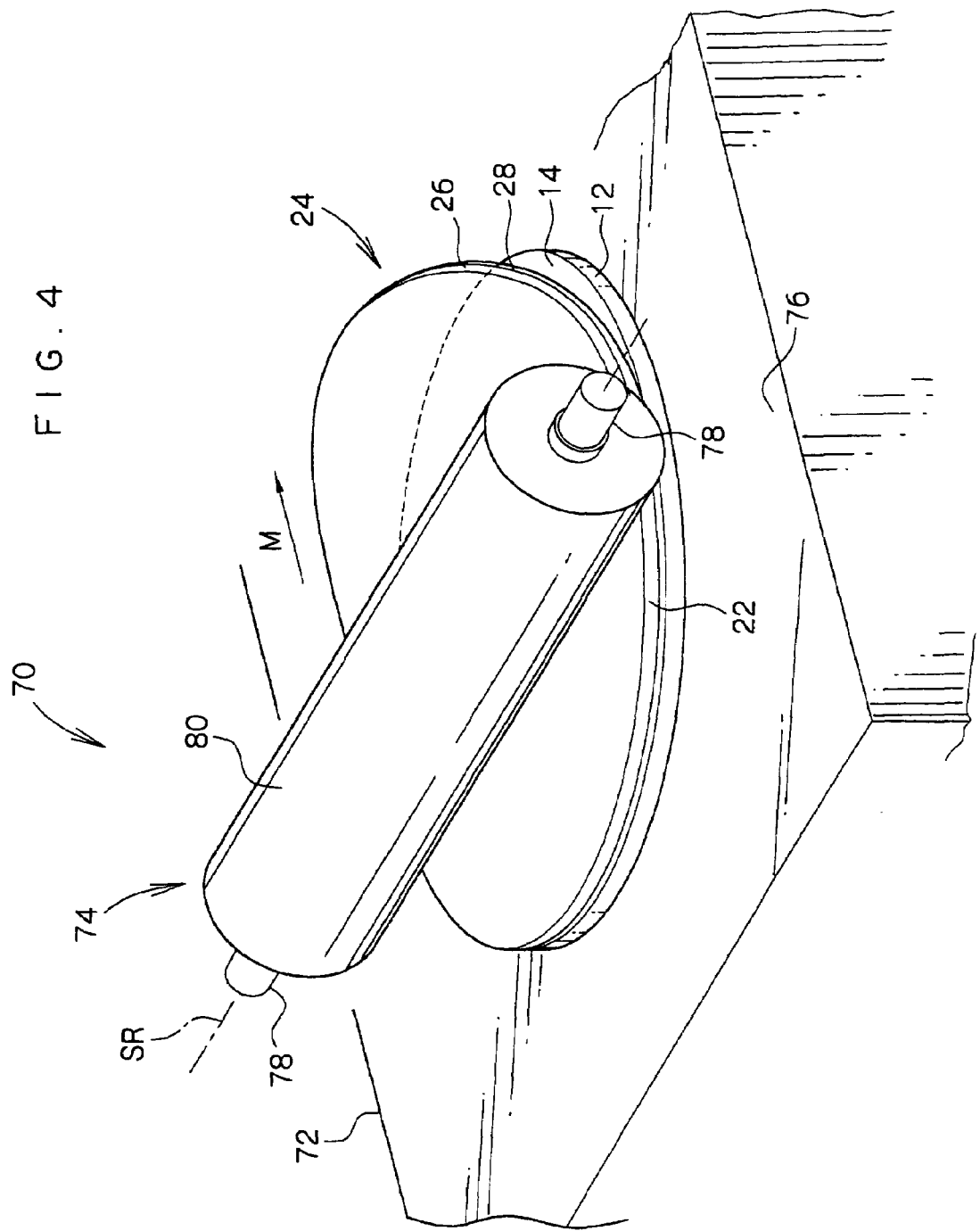
FIG. 4 is a perspective view showing a configuration of a roller pressurizing apparatus for use in the optical disk manufacturing method according to the embodiment of the invention.

In the optical disk manufacturing line, the receiving table 56 is configured as a part of a conveyance apparatus for conveying the cover sheet 24 to a roller pressurizing apparatus 70 (see FIG. 4). In the state in which the cover sheet 24 is placed on the receiving table 56, the cover sheet 24 is conveyed to the roller pressurizing apparatus 70 for adhering the cover sheet 24 onto the disk substrate 12.

Next, the roller pressurizing apparatus 70, which is used in the process for adhering the cover sheet 24 onto the disk substrate 12, will be described. As shown in FIG. 4, the roller pressurizing apparatus 70 is provided with a support table 72. Above the support table 72 a cylindrical pressurizing roller 74 is rotatably supported. The upper surface of the support table 72 serves as a placing surface 76, on which the laminate sheet material 32 is placed. A columnar center pin (not shown) projects from the center of the placing surface 76. The center pin is shorter than the thickness of the disk substrate 12, or can freely project in such a manner that the projecting length can be adjusted. The disk substrate 12 is placed on the placing surface 76 with the center pin being previously inserted into the center hole 29, and is positioned at the center of the placing surface 76.

As shown in FIG. 4, the pressurizing roller 74 is wider than the disk substrate 12 in a roller axial direction. Roller shafts 78 projecting along an axis SR are disposed at both ends of the pressurizing roller 74, respectively. A surface layer over a roller surface 80 of the pressurizing roller 74 is formed from an elastic material such as silicon rubber, urethane rubber or Viton.

Figure 5A:
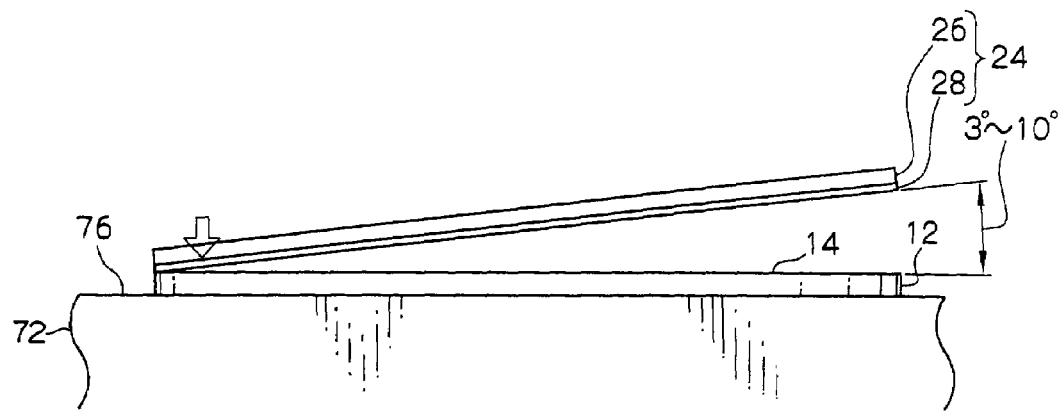
FIG. 5A is a side view showing the roller pressurizing apparatus shown in FIG. 4, illustrating operation of a pressurizing roller when the cover sheet is adhered to a disk substrate.

A description will be given of a method for adhering the cover sheet 24 to the disk substrate 12 by the use of the roller pressurizing apparatus 70 which is configured as described above. In the roller pressurizing apparatus 70, one end of the cover sheet 24 is first placed so as to coincide with one end of the disk substrate 12 while the other end of the cover sheet 24 is supported above the supporting table 72 by suction or the like, as shown in FIG. 5A. At this time, the inclination of the cover sheet 24 is adjusted such that an angle formed between the cover sheet 24 and the disk substrate 12 is from about 3° to about 10°.

Figure 5B:
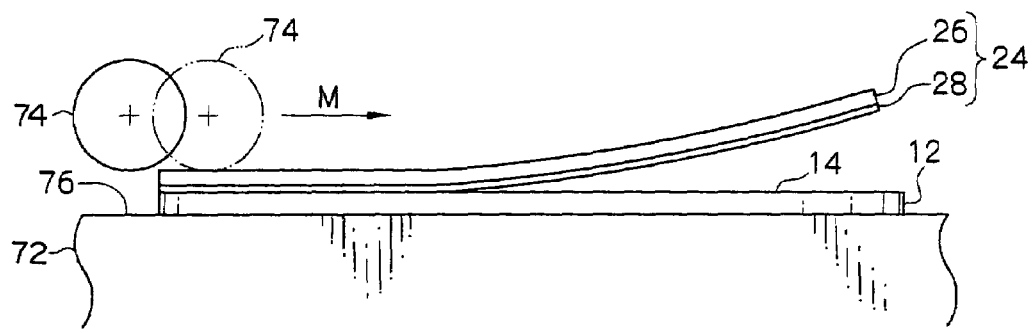
FIG. 5B is a side view showing the roller pressurizing apparatus shown in FIG. 4, illustrating the operation of the pressurizing roller when the cover sheet is adhered to the disk substrate.
Figure 5C:
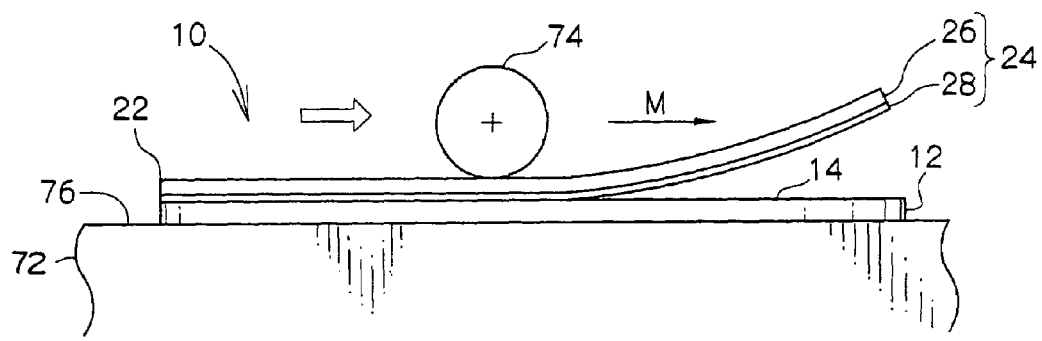
FIG. 5C is a side view showing the roller pressurizing apparatus shown in FIG. 4, illustrating the operation of the pressurizing roller when the cover sheet is adhered to the disk substrate.

Subsequently, the pressurizing roller 74, which is located at a standby position indicated by a solid line in FIG. 5B, is moved at the one end of the cover sheet 24 placed on the disk substrate 12, as indicated by a chain double-dashed line. While the pressurizing roller 74 is brought into press-contact with the resin film 26 side of the cover sheet 24, the pressurizing roller 74 is rolled from one end to the other end on the cover sheet 24. At this time, the other end of the cover sheet 24 is gradually lowered down to the disk substrate 12 side in accordance with the movement of the pressurizing roller 74. As a result, the cover sheet 24 can be adhered to the disk substrate 12 in close contact, as shown in FIG. 5C, while the air is extracted from between the adhesive film 28 of the cover sheet 24 and the disk substrate 12. At this time, a load exerted on the cover sheet 24 and the disk substrate 12 from the pressurizing roller 74 is controlled to become constant, or a pressure (i.e., a stress) exerted from the roller surface 80 of the pressurizing roller 74 is controlled to become constant. In this manner, the entire cover sheet 24 is adhered to the recording side 14 of the disk substrate 12, so that the cover layer 22 (see FIG. 1) covering the recording side 14 is formed on the disk substrate 12, thus leading to the completion of the manufacture of the optical disk 10 as a product material.

Operation of Embodiment

Next, the operation of the optical disk manufacturing method implemented in the above-described optical disk manufacturing line will be described.

Figure 6:
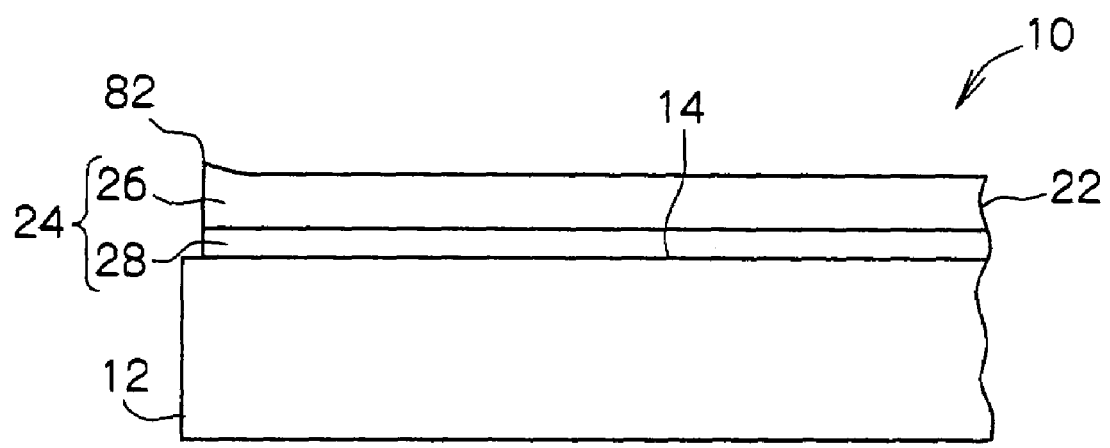
FIG. 6 is an enlarged side view showing, the outer peripheral end of an optical disk manufactured by the optical disk manufacturing method according to the embodiment of the invention.
Figure 7:
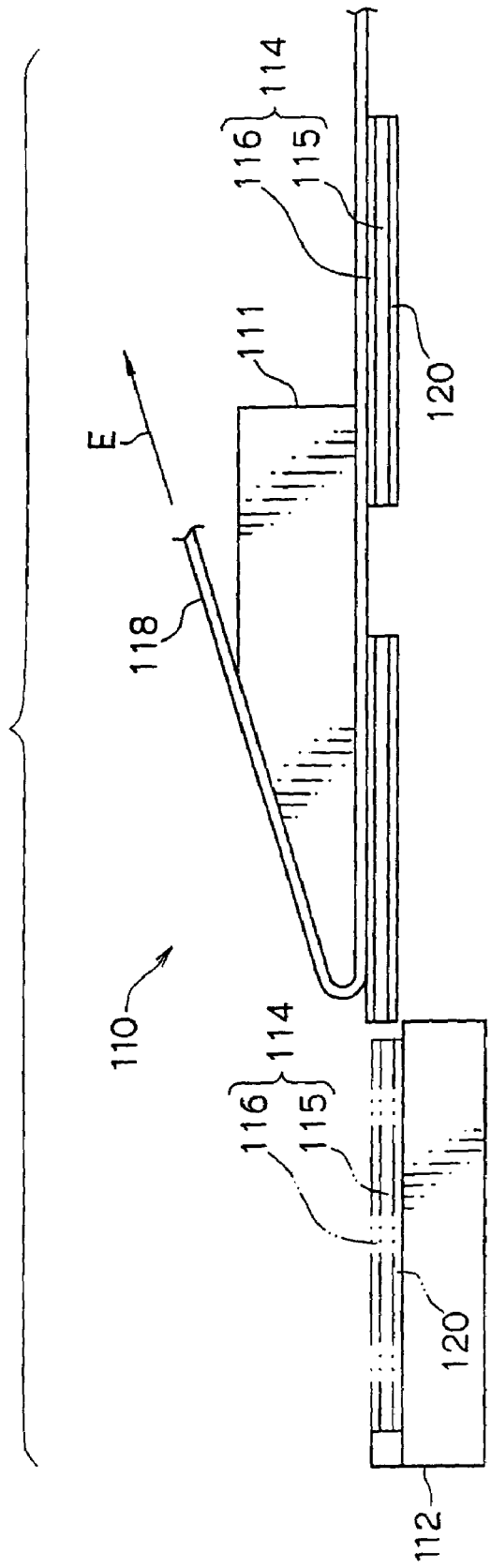
FIG. 7 is a side view showing the configurations of a slide table for conveying a cover sheet, which is formed by a conventional laminate sheet material punching method, to a receiving table and a strip-off apparatus for stripping off a strip-off sheet from the cover sheet.
Figure 8:
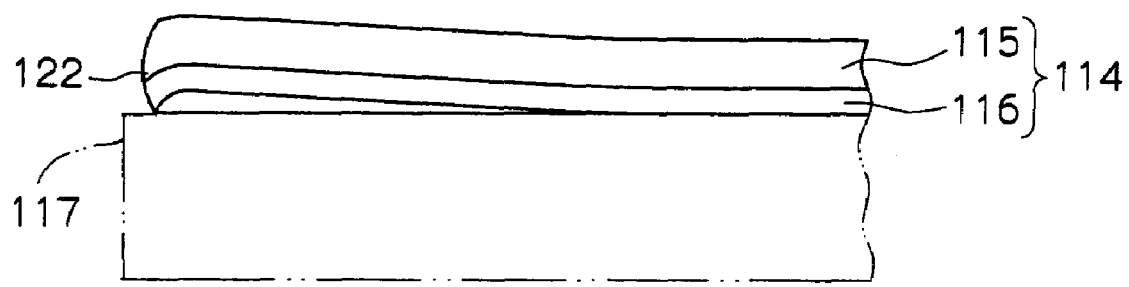
FIG. 8 is an enlarged side view showing, the outer peripheral end of an optical disk manufactured by adhering the cover sheet, which is formed by the conventional laminate sheet material punching method, onto a disk substrate.

In the punching apparatus 40 relating to the present embodiment, the punching blades 52 and 54 disposed at the roller surface 46 of the blade roller 44 are pressed against the surface of the strip-off sheet 34 in the laminate sheet material 32, and thus, they cut out the strip-off sheet 34 in the laminate sheet material 32 and the resin film 26 having the adhesive film 28 formed on one side thereof. A part of the strip-off sheet 34 and a part of the resin film 26 are punched out from the laminate sheet material 32 in the planar shape corresponding to the shape of the recording side 14 of the disk substrate 12. Consequently, the respective blade tips of the punching blades 52 and 54 bite in the resin film 26 in the laminate sheet material 32 from the surface of the adhesive film 28 toward the opposite side (i.e., the light incident side), and a part of the resin film 26 cut in the planar shape corresponding to the shape of the recording side 14 of the disk substrate 12 by the punching blades 52 and 54 is cut off as the cover sheet 24 from the residual portion. At this time, a burr 82 generated at the peripheral edge of the cover sheet punched by the shearing force of the outer peripheral punching blade 52 projects in a direction substantially the same as the direction of the shearing force of the outer peripheral punching blade 52, that is, in a direction opposite to the adhesive film 28, as shown in FIG. 6. Consequently, it is possible to prevent generation of the burr projecting toward the adhesive film 28 in the cover sheet 24 punched from the laminate sheet material 32.

Subsequently, by adhering the cover sheet 24 punched from the laminate sheet material 32, as described above, onto the recording side 14 of the disk substrate 12 using the roller pressurizing apparatus 70, the optical disk 10 is manufactured as the product material. At this time, no burr is generated at the cover sheet 24 adhered to the disk substrate 12, which projects toward the adhesive film 28. Therefore, in the case in which the cover sheet 24 is adhered to the recording side 14 of the disk substrate 12 via the adhesive film 28, it is possible to prevent degradation of the adhesiveness between the cover sheet 24 and the disk substrate 12 caused by the burr generated at the peripheral edge of the cover sheet 24 at the time of the punching operation. Furthermore, although no burr 82 is generated at the resin film 26 due to the conditions such as the material forming the resin film 26, the temperature at the time of the punching and the sharpness of each of the punching blades 52 and 54 in the method for punching the laminate sheet material 32 in the present embodiment, deformation such as a warp may be generated in the vicinity of the outer peripheral edge of the resin film 26 in the shearing direction. However, even if such deformation is generated at the resin film 26, it is possible to prevent degradation of the adhesiveness between the cover sheet 24 and the disk substrate 12.

Incidentally, in the punching apparatus 40 in the present embodiment, the protective sheet 36 is used as the carrier base for the cover sheet 24. Therefore, the protective sheet 36 is not punched out by the outer peripheral punching blade 52. However, in the case in which the protective sheet 36 is need not to be used as the carrier base, the protective sheet 36 may be punched by the outer peripheral punching blade 52 together with the resin film 26 and the strip-off sheet 34. Moreover, the strip-off sheet 34 and the cover sheet 24 processed in the punching apparatus 40 may be once rolled up with the protective sheet 36 adhered thereon, and then, the strip-off sheet 34 may be peeled off from the cover sheet 24 extending from the roll, and further, cutting off the protective sheet 36 for each per cover sheet 24.

As described above, in the laminate sheet material punching method according to the embodiment of the invention, it is possible to prevent generation of the burr which may degrade the adhesiveness between the cover sheet punched from the laminate sheet material and the disk substrate.

Furthermore, in the optical disk manufacturing method according to the embodiment of the invention, it is possible to prevent degradation of the adhesiveness between the disk substrate and the cover sheet caused by the burr generated at the cover sheet punched from the laminate sheet material.

What is claimed is:

1. A laminate sheet material punching method for punching a part of a cover sheet from a laminate sheet material in such a manner as to correspond to the shape of a recording side of a disk substrate of an optical disk, the laminate sheet material including the cover sheet having an adhesive film and a resin film, a strip-off sheet adhered to the adhesive film, and a protective sheet adhered to a surface of the cover sheet, which surface is opposite from the adhesive film, the laminate sheet material punching method comprising the steps of:

pressing a punching blade whose blade tip extends along a path corresponding to the peripheral edge of the recording side of the disk substrate, against the surface of the strip-off sheet; and cutting the cover sheet toward the protective sheet from the side of the strip-off sheet with the punching blade, wherein the blade tip reaches a vicinity of the middle of a thickness of the protective sheet during the cutting.

2. The laminate sheet material punching method according to claim 1, further comprising the step of separating the punching blade from the protective sheet before punching the protective sheet from the laminate sheet material, after a part of the strip-off sheet and a part of the cover sheet are punched from the laminate sheet material in the planar shape corresponding to the shape of the recording side of the disk substrate by the punching blade.

3. The laminate sheet material punching method according to claim 1, further comprising the step of rotating a blade roller and a receiving roller so as to convey the laminate sheet material while holding the laminate sheet material between the blade roller, which has the punching blade at a roller surface facing the surface of the strip-off sheet, and the receiving roller which has a roller surface facing the surface of the protective sheet.

4. The laminate sheet material punching method according to claim 3, wherein, when the laminate sheet material is conveyed by the blade roller and the receiving roller, the punching blade is pressed against the surface of the strip-off sheet of the laminate sheet material, the strip-off sheet and the cover sheet of the laminate sheet material are cut by the punching blade, and a part of the strip-off sheet and a part of the cover sheet are punched from the laminate sheet material in the planar shape corresponding to the shape of the recording side of the disk substrate.

5. The laminate sheet material punching method according to claim 1, wherein the protective sheet is cut together with the strip-off sheet and the cover sheet.

6. An optical disk manufacturing method for adhering, to a recording side of a disk substrate, a cover sheet punched from a laminate sheet material according to a laminate sheet material punching method for punching a part of a cover sheet from a laminate sheet material in such a manner as to correspond to the shape of a recording side of a disk substrate of an optical disk, the laminate sheet material including the cover sheet having an adhesive film and a resin film, a strip-off sheet adhered to the adhesive film, and a protective sheet adhered to a surface of the cover sheet, which surface is opposite from the adhesive film, the laminate sheet material punching method comprising the steps of:

a. pressing a punching blade whose blade tip extends along a path corresponding to the peripheral edge of the recording side of the disk substrate, against the surface of the strip-off sheet; and b. cutting the cover sheet toward the protective sheet from the side of the strip-off sheet with the punching blade, the optical disk manufacturing method comprising the steps of:

disposing the adhesive film of the cover sheet so as to face the recording side of the disk substrate;

placing one end of the cover sheet so as to coincide with one end of the disk substrate, and holding another end of the cover sheet so as to form a predetermined angle between the cover sheet and the disk substrate; and gradually lowering the other end of the cover sheet so as to coincide with the other end of the disk substrate, wherein the blade tip reaches a vicinity of the middle of a thickness of the protective sheet during the cutting.

7. The optical disk manufacturing method according to claim 6, wherein the predetermined angle formed between the cover sheet and the disk substrate is substantially from 30° to 10°.

8. The optical disk manufacturing method according to claim 6, wherein a pressurizing roller is moved on the cover sheet from one end to the other end thereof, so that the cover sheet is adhered to the recording side of the disk substrate.

9. The optical disk manufacturing method according to claim 8, wherein the pressurizing roller is controlled so as to apply a constant load to the cover sheet and to the disk substrate.

10. The laminate sheet material punching method according to claim 6, wherein the laminate sheet material is punched from the side of the strip-off sheet by the punching blade in the step of cutting the strip-off sheet and the cover sheet.

11. The laminate sheet material punching method according to claim 6, wherein the protective sheet is cut together with the strip-off sheet and the cover sheet.

12. The laminate sheet material punching method according to claim 6, further comprising the step of separating the punching blade from the protective sheet before punching the protective sheet from the laminate sheet material, after a part of the strip-off sheet and a part of the cover sheet are punched from the laminate sheet material in the planar shape corresponding to the shape of the recording side of the disk substrate by the punching blade.

13. The laminate sheet material punching method according to claim 6, further comprising the step of rotating a blade roller and receiving roller so as to convey the laminate sheet material while holding the laminate sheet material between the blade roller, which has the punching blade at a roller surface facing the surface of the strip-off sheet, and the receiving roller which has a roller surface facing the surface of the protective sheet.

* * * * *